(12) United States Patent
Bizet et al.

(10) Patent No.: US 12,391,810 B2
(45) Date of Patent: Aug. 19, 2025

(54) GELLED POLYMER MEMBRANE FOR LI-ION BATTERY

(71) Applicant: Arkema France, Colombes (FR)

(72) Inventors: Stephane Bizet, Serquigny (FR); Gregory Schmidt, Pierre-Benite (FR); Jerome Chauveau, Serquigny (FR)

(73) Assignee: Arkema France, Puteaux (FR)

( * ) Notice: Subject to any disclaimer, the term of this patent is extended or adjusted under 35 U.S.C. 154(b) by 564 days.

(21) Appl. No.: 17/776,248

(22) PCT Filed: Nov. 10, 2020

(86) PCT No.: PCT/FR2020/052050
§ 371 (c)(1),
(2) Date: May 12, 2022

(87) PCT Pub. No.: WO2021/094681
PCT Pub. Date: May 20, 2021

(65) Prior Publication Data
US 2022/0389178 A1 Dec. 8, 2022

(30) Foreign Application Priority Data
Nov. 13, 2019 (FR) .................. FR19.12661

(51) Int. Cl.
| | | |
|---|---|---|
| H01M 50/426 | (2021.01) |
| C08J 5/18 | (2006.01) |
| H01M 10/0525 | (2010.01) |
| H01M 10/44 | (2006.01) |
| H01M 50/449 | (2021.01) |

(52) U.S. Cl.
CPC ............ C08J 5/18 (2013.01); H01M 10/0525 (2013.01); H01M 10/44 (2013.01); H01M 50/426 (2021.01); H01M 50/449 (2021.01); *C08J 2327/16* (2013.01); *C08J 2327/20* (2013.01)

(58) Field of Classification Search
CPC ...... C08J 5/18; C08J 2327/16; C08J 2327/20; H01M 50/426; H01M 50/449; H01M 10/0525; H01M 10/44
See application file for complete search history.

(56) References Cited

U.S. PATENT DOCUMENTS

| | | | |
|---|---|---|---|
| 5,296,318 A | 3/1994 | Gozdz et al. | |
| 6,218,051 B1 | 4/2001 | Yokohata | |
| 2007/0243460 A1* | 10/2007 | Carlson | H01M 50/451 429/62 |
| 2013/0022806 A1* | 1/2013 | Bonnet | B32B 27/28 47/20.1 |
| 2013/0037754 A1* | 2/2013 | Abusleme | C08L 27/16 252/500 |
| 2014/0255754 A1 | 9/2014 | Nishikawa et al. | |
| 2015/0303003 A1* | 10/2015 | Ha | H01M 50/451 136/252 |
| 2016/0293957 A1 | 10/2016 | Okae et al. | |
| 2017/0263908 A1* | 9/2017 | Laicer | H01M 50/446 |
| 2019/0088916 A1 | 3/2019 | Wu et al. | |

FOREIGN PATENT DOCUMENTS

| | | | | |
|---|---|---|---|---|
| CN | 103840198 A | | 6/2014 | |
| CN | 106654119 A | * | 5/2017 | |
| EP | 1011157 A2 | | 6/2000 | |
| JP | 2001023694 A | | 1/2001 | |
| JP | 2002249589 A | | 9/2002 | |
| KR | 100740548 B1 | | 7/2007 | |
| WO | WO-2020206097 A1 | * | 10/2020 | H01M 10/0525 |

OTHER PUBLICATIONS

CN-106654119 MT (Year: 2017).*
The decision of JPO to grant a Patent for Application JP 2022527728 (Year: 2024).*
The decision of EPO to grant a European Patent for Application EP.4058508 (Year: 2023).*

* cited by examiner

*Primary Examiner* — Alexander Usyatinsky
(74) *Attorney, Agent, or Firm* — Joanne Rossi

(57) ABSTRACT

The invention relates to a fluoropolymer film which makes it possible to manufacture a gelled dense membrane which offers a very good compromise between ionic conductivity and mechanical strength after swelling. This membrane is intended for use as a separator for Li-ion batteries.

17 Claims, No Drawings

GELLED POLYMER MEMBRANE FOR LI-ION BATTERY

This application is a national stage application under 35 U.S.C. § 371 of PCT Application PCT/FR2020/052050, filed 10 Nov. 2020; which claims benefit to French National Patent Number FR19.12661, filed 13 Nov. 2019; said applications incorporated herein by reference.

FIELD OF THE INVENTION

The present invention relates generally to the field of electrical energy storage in rechargeable storage batteries of Li-ion type. More specifically, the invention relates to a fluoropolymer film which makes it possible to manufacture a gelled dense membrane which offers a very good compromise between ionic conductivity and mechanical strength after swelling. This membrane is intended for use as a separator for Li-ion batteries.

TECHNICAL BACKGROUND

A Li-ion battery includes at least one negative electrode or anode coupled to a copper current collector, a positive electrode or cathode coupled to an aluminum current collector, a separator and an electrolyte. The electrolyte consists of a lithium salt, generally lithium hexafluorophosphate, mixed with a solvent which is a mixture of organic carbonates, which are chosen in order to optimize the transportation and the dissociation of the ions. A high dielectric constant promotes the dissociation of the ions, and thus the number of ions available in a given volume, while a low viscosity promotes the ionic diffusion which plays an essential role, among other parameters, in the rates of charge and discharge of the electrochemical system.

Rechargeable, or storage, batteries are more advantageous than primary batteries (which are not rechargeable) because the associated chemical reactions taking place at the positive and negative electrodes of the battery are reversible. The electrodes of the storage cells can be regenerated multiple times by application of an electrical charge. Many advanced electrode systems have been developed for storing the electrical charge. In parallel, great efforts have been devoted to developing electrolytes capable of improving the capacities of electrochemical cells.

Located between the two electrodes, the separator acts as mechanical and electronic barrier and as ion conductor. Several categories of separators exist: dry polymer membranes, gelled polymer membranes and micro- or macroporous separators impregnated with liquid electrolyte.

The separators market is dominated by the use of polyolefins (Celgard® or Solupor®) produced by extrusion and/or drawing. Separators have to simultaneously exhibit low thicknesses, an optimum affinity for the electrolyte and a satisfactory mechanical strength. Among the most advantageous alternatives to polyolefins, polymers exhibiting a better affinity with regard to standard electrolytes have been proposed, in order to reduce the internal resistances of the system, such as poly(methyl methacrylate) (PMMA), poly (vinylidene fluoride) (PVDF) and poly(vinylidene fluoride-co-hexafluoropropene) (P(VDF-co-HFP)).

Dry polymer membranes, without liquid solvent, avoid the use of flammable liquid components as in conventional Li-ion batteries and allow the production of thinner and more flexible batteries. However, they have properties which are clearly inferior to those of liquid electrolytes, in particular for the ionic conductivity. Good conductivity is necessary for the high-throughput operation required, for example, by cell phones and satellites.

Gelled dense membranes constitute another alternative to separators impregnated with liquid electrolyte. The term "dense membranes" refers to membranes which no longer have any free porosity. They are swollen by the solvent but the latter, tightly bonded chemically to the membrane material, has lost all its solvating properties; the solvent then passes through the membrane without entraining solute. In the case of these membranes, the free spaces correspond to those left between them by the polymer chains and have the size of simple organic molecules or hydrated ions.

The advantage of gelled dense membranes is to offer a better guarantee of safety compared to a separator based on liquid electrolyte. In addition, this type of separator may be advantageous for cell technologies using a lithium foil as anode and thus limit the formation of dendrites on the surface of the anode.

The difficulty with gelled membranes is that of reconciling a high ionic conductivity while at the same time retaining a mechanical strength after swelling sufficient to make possible easy handling of the separator for the manufacture of the cell and to withstand the mechanical stresses during the charging/discharging cycles of the battery. Gelled electrolytes contain a significant fraction of solvents (or plasticizers), in addition to the salt and polymer of the electrolyte itself.

Poly(vinylidene fluoride) (PVDF) and its derivatives exhibit an advantage as main constituent material of the separator for their electrochemical stability and for their high dielectric constant, which promotes the dissociation of the ions and thus the conductivity. The copolymer P(VDF-co-HFP) (copolymer of vinylidene fluoride (VDF) and of hexafluoropropylene (HFP)) has been studied as gelled membrane because it exhibits a lower crystallinity than PVDF. For this reason, the advantage of these P(VDF-co-HFP) copolymers is that they make it possible to achieve greater swellings and to thus promote the conductivity.

Document U.S. Pat. No. 5,296,318 describes separators based on VDF-HFP copolymers swollen in an electrolyte consisting of a lithium salt ($LiPF_6$) and of a mixture of carbonates as solvent. The examples described use the Kynar Flex® 2801 and 2750 at 12% and 15% by weight of HFP respectively. More generally, this patent claims an optimum HFP content of between 8% and 25% by weight of HFP. Below 8% of HFP, the authors mention difficulties related to the use of the membrane. Beyond 25%, the mechanical strength becomes insufficient after swelling. The process for manufacturing the separator is a solvent-based process which involves the use of a very volatile solvent, tetrahydrofuran. The ionic conductivity reported in examples 1 and 2 is 0.3 mS/cm and 0.4 mS/cm, respectively.

This document describes the need to use an additional crosslinking step, for separators based on VDF-HFP copolymer having an HFP content greater than 25% by weight, in order to reinforce their mechanical strength after swelling. These copolymers give satisfactory results even after heating up to 70° C. However, the plasticized copolymer is soluble in the liquid electrolyte at temperatures above 80° C. Melting of the electrolyte film under constant stress can cause the electrolyte to flow and the battery to short circuit internally, resulting in rapid discharging and heating.

In order to solve this problem, document US 2019/088916 proposes a nonporous separator containing macromolecular materials which can be gelled by an organic solvent in the electrolyte solution, and form a polymer gel electrolyte upon addition of the electrolyte solution. This nonporous separator comprises at least one synthetic macromolecular compound or one natural macromolecular compound, and also comprises, as matrix, at least one macromolecular material which cannot be gelled by an organic solvent. The examples show that the non-gellable polymer is used in the form of a porous membrane which is impregnated with a solution of the gellable polymer. This approach therefore imposes a complex step for manufacturing the porous membrane of the non-gellable polymer, which makes it possible to control the degree of porosity and the nature of the porosity (pore size and degree of open porosity). In addition, the manufacturing process requires the use of a solvent-based step to impregnate the porosities of the porous membrane, which has the drawback of using solvents and requires an evaporation step.

Moreover, this approach requires that the gellable and non-gellable macromolecular materials be of very different chemical nature. This implies poor adhesion between the gellable and non-gellable macromolecular materials, which can be detrimental to the durability of the battery performance. Finally, the fraction of gellable polymer, responsible for the ionic conductivity, represents only a fraction of the membrane, which does not make it possible to optimize the surface of contact of the ionic conductive part of the separator with the electrodes.

There still exists a need to develop new gelled separators which exhibit a good compromise between ionic conductivity and mechanical strength after swelling, and which are suitable for a simplified use, without requiring prior transformation steps.

The aim of the invention is thus to overcome at least one of the drawbacks of the prior art, namely to propose a polymeric film which is able to keep, after swelling in a solvent, good mechanical strength and good ionic conductivity.

The invention also aims to provide a process for manufacturing this polymeric film which comprises a single step of extrusion from a formulation based on fluoropolymers.

The invention also relates to the gelled polymer membranes comprising said polymeric film, impregnated in an electrolyte consisting of a mixture of solvent(s) and of lithium salt(s).

Another subject of the invention is a separator for a Li-ion storage battery consisting, in all or part, of said gelled polymer membrane.

Finally, the invention is targeted at providing rechargeable Li-ion storage batteries comprising such a separator.

SUMMARY OF THE INVENTION

The technical solution proposed by the present invention is a fluoropolymer film based on a mixture of at least two fluoropolymers having different crystallinities.

The invention relates first and foremost to a nonporous fluoropolymer film comprising at least one layer, said layer consisting of a mixture of two fluoropolymers: a fluoropolymer A which comprises at least one copolymer of vinylidene fluoride (VDF) and of hexafluoropropylene (HFP) having an HFP content of greater than or equal to 3% by weight, and a fluoropolymer B which comprises a VDF homopolymer and/or at least one VDF-HFP copolymer, said fluoropolymer B having a weight content of HFP which is at least 3% by weight lower than the weight content of HFP of the polymer A.

The fluoropolymer A comprises at least one VDF-HFP copolymer having an HFP content of greater than or equal to 3% by weight, preferably greater than or equal to 8%, advantageously greater than or equal to 13%.

Its weight content in the fluoro film formulation is greater than or equal to 10% by weight and less than or equal to 99%, preferentially greater than or equal to 25% and less than or equal to 95%, preferentially greater than or equal to 50% and less than or equal to 95%.

The fluoropolymer B comprises at least one VDF-HFP copolymer having a weight content of HFP which is at least 3% lower than the weight content of HFP of the polymer A. Its weight content in the fluoro film formulation is less than or equal to 90% and greater than 1%; preferably, it is less than 75% and greater than 5%, and advantageously less than 50% and greater than 5%.

According to one embodiment, said fluoropolymer film is a monolayer film.

According to another embodiment, said fluoropolymer film comprises at least two layers of polymers, at least one of which consists of the mixture of two fluoropolymers described above.

The invention also relates to a gelled polymer membrane comprising the fluoropolymer film described above, and an electrolyte comprising at least one solvent and at least one lithium salt and optionally at least one additive.

According to one embodiment, said solvent is chosen from cyclic and acyclic alkyl carbonates, ethers, formates, nitriles, esters and lactones.

Another subject of the invention is a separator for a rechargeable Li-ion battery consisting, in all or part, of the gelled polymer membrane described above.

Another subject of the invention is a Li-ion storage battery comprising a negative electrode, a positive electrode and a separator, wherein said separator comprises a gelled polymer membrane as described above.

The present invention makes it possible to overcome the disadvantages of the state of the art. It more particularly provides a nonporous fluoropolymer film capable, after swelling in an electrolyte and in the presence of lithium salts, of providing a separator which combines high ionic conductivity and sufficient mechanical strength to allow easy handling of the separator.

The advantage of this technology is that it offers a better guarantee of safety compared to a separator based on liquid electrolyte. In addition, this type of separator may be advantageous for cell technologies using a lithium foil as anode and thus limit the formation of dendrites on the surface of the anode.

DESCRIPTION OF EMBODIMENTS OF THE INVENTION

The invention is now described in more detail and in a nonlimiting way in the description which follows.

According to a first aspect, the invention relates to a nonporous fluoropolymer film comprising at least one layer, said layer consisting of a mixture of two fluoropolymers: a fluoropolymer A which comprises at least one copolymer of vinylidene fluoride (VDF) and of hexafluoropropylene (HFP) having an HFP content of greater than or equal to 3% by weight, and a fluoropolymer B which comprises a VDF homopolymer and/or at least one VDF-HFP copolymer, said fluoropolymer B having a weight content of HFP which is at least 3% by weight lower than the weight content of HFP of the polymer A.

According to various implementations, said film comprises the following features, if appropriate combined. The contents indicated are expressed by weight, unless otherwise indicated.

According to a first embodiment, said film consists of a single layer.

The fluoropolymer A comprises at least one VDF-HFP copolymer having an HFP content of greater than or equal to 3% by weight, preferably greater than or equal to 8%, advantageously greater than or equal to 13%. Said VDF-HFP copolymer has an HFP content of less than or equal to 55%, preferably less than or equal to 50%.

This very low-crystallinity copolymer swells readily in electrolyte solvents, thereby allowing the film to be given a good ionic conductivity. The swelling can be quantified by the gain in mass of the film in electrolyte. The gain in mass of this copolymer is advantageously at least greater than or equal to 5% by weight.

According to one embodiment, the fluoropolymer A consists of a single VDF-HFP copolymer having an HFP content of greater than or equal to 3%. According to one embodiment, the HFP content of this VDF-HFP copolymer is between 13% and 55%, endpoints included, preferably between 15% and 50%, endpoints included.

According to one embodiment, the fluoropolymer A consists of a mixture of two or more VDF-HFP copolymers, the HFP content of each copolymer being greater than or equal to 3%. According to one embodiment, each of the copolymers has an HFP content of between 13% and 55%, endpoints included, preferably between 15% and 50%, endpoints included.

The molar composition of the units in the fluoropolymers may be determined by various means such as infrared spectroscopy or Raman spectroscopy. Conventional methods of elemental analysis of carbon, fluorine and chlorine or bromine or iodine elements, such as X-ray fluorescence spectroscopy, make it possible to calculate unambiguously the weight composition of the polymers, from which the molar composition is deduced.

Use may also be made of multinuclear NMR techniques, notably proton (1H) and fluorine (19F) NMR techniques, by analysis of a solution of the polymer in a suitable deuterated solvent. The NMR spectrum is recorded on an FT-NMR spectrometer equipped with a multinuclear probe. The specific signals given by the various monomers in the spectra produced according to one or another nucleus are then identified.

The fluoropolymer B comprises at least one VDF-HFP copolymer having a weight content of HFP which is at least 3% lower than the weight content of HFP of the polymer A.

According to one embodiment, the fluoropolymer B is a vinylidene fluoride (VDF) homopolymer or a mixture of vinylidene fluoride homopolymers.

According to one embodiment, the fluoropolymer B consists of a single VDF-HFP copolymer. According to one embodiment, the HFP content of this VDF-HFP copolymer is between 1% and 5%, endpoints included. According to another embodiment, the HFP content of this VDF-HFP copolymer is between 1% and 10%, endpoints included.

According to one embodiment, the fluoropolymer B is a mixture of PVDF homopolymer with a VDF-HFP copolymer or else a mixture of two or more VDF-HFP copolymers.

According to one embodiment, said mixture comprises:
  i. a weight content of polymer A of greater than or equal to 10% and less than or equal to 99%, preferably greater than or equal to 50% and less than or equal to 95%, advantageously greater than or equal to 25% and less than or equal to 95%, and
  ii. a weight content of polymer B of less than or equal to 90% and greater than 1%, preferably less than 50% and greater than 5%.

According to one embodiment, said monolayer fluoropolymer film has a thickness of 1 to 1000 μm, preferably of 1 μm to 500 μm, and more preferentially still between 5 μm and 100 μm.

Advantageously, in the fluoropolymer film according to the invention, the fluoropolymers A and B are mixed so as to obtain an intimate mixture of these polymers; in this mixture, each of the polymers A and B is in the molten state.

According to one embodiment, when the film is a monolayer film, said fluoropolymer film may be manufactured by a solvent-mediated process. Polymers A and B are dissolved in a known solvent for polyvinylidene fluoride or its copolymers. Non-exhaustive examples of the solvent include N-methyl-2-pyrrolidone, dimethyl sulfoxide, dimethylformamide, methyl ethyl ketone and acetone. The film is obtained after the solution is applied to a flat substrate and the solvent evaporated.

According to one embodiment, said fluoropolymer film is a multilayer film in which at least one of the layers is composed of a mixture of polymers A and B according to the invention. The overall thickness of the multilayer film is between 2 μm and 1000 μm, with the thickness of the fluoropolymer layer according to the invention being between 1 μm and 999 μm.

The additional layer or layers are chosen from the following polymeric compositions:
  a composition consisting of a fluoropolymer chosen from vinylidene fluoride homopolymers and VDF-HFP copolymers containing preferably at least 90% by weight of VDF;
  a composition consisting of a mixture of fluoropolymer chosen from vinylidene fluoride homopolymers and VDF-HFP copolymers containing preferably at least 85% by weight of VDF, with a methyl methacrylate (MMA) homopolymer and the copolymers containing at least 50% by weight of MMA and at least one other monomer copolymerizable with MMA. Examples of a comonomer copolymerizable with MMA include alkyl (meth)acrylates, acrylonitrile, butadiene, styrene and isoprene. The MMA polymer (homopolymer or copolymer) advantageously comprises by weight from 0 to 20% and preferably 5 to 15% of a C1-C8 alkyl (meth)acrylate, which is preferably methyl acrylate and/or ethyl acrylate. The MMA polymer (homopolymer or copolymer) may be functionalized, meaning that it contains, for example, acid, acyl chloride, alcohol or anhydride functions. These functions may be introduced by grafting or by copolymerization. The functionality advantageously is in particular the acid function provided by the acrylic acid comonomer. A monomer may also be used that has two vicinal acrylic acid functions able to undergo dehydration to form an anhydride. The proportion of functionality may be from 0 to 15% by weight of the MMA polymer, for example from 0 to 10% by weight.

According to one embodiment, said fluoropolymer film is manufactured by a melt-state polymer conversion process such as flat film extrusion, blown film extrusion, calendering or compression molding.

According to one embodiment, before the step of manufacturing the film, the fluoropolymers A and B are intimately mixed in the molten state, by extrusion using a twin-screw extruder or a co-kneader.

The invention also relates to a gelled polymer membrane comprising the fluoropolymer film described above, and an electrolyte comprising at least one solvent and at least one lithium salt.

According to one embodiment, the membrane further comprises inorganic fillers such as silicon oxides, titanium dioxide, aluminum oxides or zirconium oxide. The weight content of the inorganic fillers is less than or equal to 25% relative to the weight of the fluoropolymers A and B.

According to one embodiment, the membrane also comprises solid electrolytes such as lithium superionic conductors [Lithium superionic conductor (LISICON)] and derivatives, thio-LISICONs, structures of $Li_4SiO_4$—$Li_3PO_4$ type, sodium superionic conductors and derivatives [Sodium superionic conductor (NASICON)], structures of $Li_{1.3}Al_{0.3}Ti_{1.7}(PO_4)_3$ (LATP) type, garnet structures $Li_7La_3Zr_2O_{12}$ (LLZO) and derivatives, perovskite structures $Li_{3x}La_{2/3-2x}\square_{1/3-2x}TiO_3$ (0<x<0.16) (LLTO) and amorphous, crystalline or semicrystalline sulfides. The weight content of the solid electrolytes is less than or equal to 10% relative to the weight of the fluoropolymers A and B.

According to one embodiment, said solvent is chosen from cyclic and acyclic alkyl carbonates, ethers, glymes, formates, esters and lactones.

Mention may be made, among the ethers, of linear or cyclic ethers, such as dimethoxyethane (DME), methyl ethers of oligoethylene glycols of 2 to 100 oxyethylene units, dioxolane, dioxane, dibutyl ether, tetrahydrofuran, and mixtures thereof.

Mention may be made, among the esters, of phosphoric acid esters and sulfite esters. Mention may be made, for example, of methyl formate, methyl acetate, methyl propionate, ethyl acetate, butyl acetate or mixtures thereof.

The glymes used are of general formula $R_1$—O—$R_2$—O—$R_3$ wherein $R_1$ and $R_3$ are linear alkyls of 1 to 5 carbons and $R_2$ is a linear or branched alkyl chain of 3 to 10 carbons.

Mention may in particular be made, among the lactones, of gamma-butyrolactone.

Mention may be made, among the nitriles, for example, of acetonitrile, pyruvonitrile, propionitrile, methoxypropionitrile, dimethylaminopropionitrile, butyronitrile, isobutyronitrile, valeronitrile, pivalonitrile, isovaleronitrile, glutaronitrile, methoxyglutaronitrile, 2-methylglutaronitrile, 3-methylglutaronitrile, adiponitrile, malononitrile and mixtures thereof.

Mention may be made, among the carbonates, for example, of cyclic carbonates, such as, for example, ethylene carbonate (EC) (CAS: 96-49-1), propylene carbonate (PC) (CAS: 108-32-7), butylene carbonate (BC) (CAS: 4437-85-8), dimethyl carbonate (DMC) (CAS: 616-38-6), diethyl carbonate (DEC) (CAS: 105-58-8), ethyl methyl carbonate (EMC) (CAS: 623-53-0), diphenyl carbonate (CAS: 102-09-0), methyl phenyl carbonate (CAS: 13509-27-8), dipropyl carbonate (DPC) (CAS: 623-96-1), methyl propyl carbonate (MPC) (CAS: 1333-41-1), ethyl propyl carbonate (EPC), vinylene carbonate (VC) (CAS: 872-36-6), fluoroethylene carbonate (FEC) (CAS: 114435-02-8), trifluoropropylene carbonate (CAS: 167951-80-6) or mixtures thereof.

According to one embodiment, said lithium salt is chosen from: $LiPF_6$ (lithium hexafluorophosphate), LiFSI (lithium bis(fluorosulfonyl)imide), LiTDI (lithium 2-trifluoromethyl-4,5-dicyanoimidazolate), $LiPOF_2$, $LiB(C_2O_4)_2$, $LiF_2B(C_2O_4)_2$, $LiBF_4$, $LiNO_3$, $LiClO_4$.

According to one embodiment, the electrolyte comprises at least one additive in addition to the solvent and the lithium salt. The additive may be chosen from the group consisting of fluoroethylene carbonate (FEC), vinylene carbonate, 4-vinyl-1,3-dioxolan-2-one, pyridazine, vinylpyridazine, quinoline, vinylquinoline, butadiene, sebaconitrile, alkyl disulfides, fluorotoluene, 1,4-dimethoxytetrafluorotoluene, t-butylphenol, di-t-butylphenol, tris(pentafluorophenyl)borane, oximes, aliphatic epoxides, halogenated biphenyls, methacrylic acids, allyl ethyl carbonate, vinyl acetate, divinyl adipate, propane sultone, acrylonitrile, 2-vinylpyridine, maleic anhydride, methyl cinnamate, phosphonates, silane compounds containing a vinyl, and 2-cyanofuran.

The additive may also be chosen from salts having a melting temperature of less than 100° C. such as ionic liquids, which form liquids consisting solely of cations and anions.

Examples of organic cations include in particular the following cations ammonium, sulfonium, pyridinium, pyrrolidinium, imidazolium, imidazolinium, phosphonium, lithium, guanidinium, piperidinium, thiazolium, triazolium, oxazolium, pyrazolium, and mixtures thereof.

Examples of anions include in particular the imides, especially bis(trifluoromethanesulfonyl)imide (abbreviated $NTf2^-$); borates, especially tetrafluoroborate (abbreviated $BF_4^-$); phosphates, especially hexafluorophosphate (abbreviated $PF_6^-$); phosphinates and phosphonates, especially alkyl-phosphonates; amides, especially dicyanamide (abbreviated $DCA^-$); aluminates, especially tetrachloroaluminate ($AlCl_4^-$), halides (such as bromide, chloride or iodide anions), cyanates, acetates ($CH_3COO^-$), especially trifluoroacetate; sulfonates, especially methanesulfonate ($CH_3SO_3^-$), trifluoromethanesulfonate; sulfates, especially hydrogen sulfate.

According to one embodiment, said electrolyte has a salt concentration of 0.05 mol/liter to 5 mol/liter in the solvent.

According to one embodiment, the electrolyte/fluoropolymers ratio in the membrane according to the invention is from 0.05 to 20, preferentially from 0.1 to 10.

According to one embodiment, the membrane according to the invention has an ionic conductivity ranging from 0.01 to 5 mS/cm. The conductivity is measured by impedance spectroscopy.

According to one embodiment, the membrane according to the invention exhibits a mechanical strength characterized by an elastic modulus, measured at 1 Hz and 23° C. by dynamic mechanical analysis, of greater than 0.01 MPa, preferentially of greater than 0.1 MPa.

A conductivity cell is then immersed in each of the solutions and three impedance spectroscopy determinations were carried out. These spectroscopy determinations are carried out between 500 mHz and 100 kHz with an amplitude of 10 mV. The constant of the cell used is 1.12 and the ionic conductivity is calculated according to the following formula:

$$\sigma = \frac{1}{R} \times 1.12$$

where R represents the resistance which is obtained by linear regression of the curve Im(Z)=f(Re(Z)). In the specific case of Im(Z)=0, R is equal to the opposite of the ordinate at the origin divided by the slope of the linear regression equation.

According to one embodiment, said film in the membrane according to the invention exhibits a gain in mass at least greater than or equal to 5% by weight, preferably ranging from 10% to 1000%.

The separator according to the invention is advantageously nonporous, meaning that the gas permeability of the separator is 0 ml/min, as detected by the gas permeability test (when the surface area of the separator is 10 cm², the difference in pressure of gas on either side is 1 atm, and the time is 10 minutes).

According to one embodiment, the gelled polymer membrane is obtained from the succession of the following steps:

Production of a mixture of the fluoropolymers A and B by a melt-mixing process such as twin-screw extrusion.

Manufacture of a film by extruding the mixture using a blow-molding or flat extrusion process.

Impregnation of the film obtained by immersion in an electrolyte consisting of a solvent and of a lithium salt until the film is saturated. The film thus obtained constitutes the gelled membrane intended to be incorporated into a lithium-ion battery cell. A variant of the impregnation step is possible. The film can be placed in the cell in the dry state and the electrolyte added in a second step, the impregnation of the electrolyte into the membrane taking place in-situ in the cell.

Another subject of the invention is a separator for a Li-ion storage battery consisting, in all or part, of said gelled polymer membrane. According to one embodiment, said separator contains a single gelled polymer membrane according to the invention. According to another embodiment, said separator consists of a multilayer film wherein each layer has the composition of the film according to the invention. In the separator according to the invention, the membrane is advantageously not supported by a support.

Another subject of the invention is a Li-ion storage battery comprising a negative electrode, a positive electrode and a separator, wherein said separator comprises a gelled polymer membrane as described above.

EXAMPLES

The following examples non-limitingly illustrate the scope of the invention.

Products:

PVDF 1: Copolymer of vinylidene fluoride (VDF) and of vinylidene hexafluoride (HFP) containing 25% by weight of HFP, characterized by a melt viscosity of 1000 Pa·s at 100 s$^{-1}$ and 230° C.

PVDF 2: Copolymer of vinylidene fluoride (VDF) and of vinylidene hexafluoride (HFP) at 18% by weight of HFP, characterized by a melt viscosity of 1200 Pa·s at 100 s$^{-1}$ and 230° C.

PVDF 3: Vinylidene fluoride homopolymer, characterized by a melt viscosity of 1000 Pa·s at 100 s$^{-1}$ and 230° C.

PVDF 4 (Kynarflex 2750-10): Copolymer of vinylidene fluoride (VDF) and of vinylidene hexafluoride (HFP) at 15% by weight of HFP, characterized by a melt viscosity of 900 Pa·s at 100 s$^{-1}$ and 230° C.

PVDF 5 (Kynarflex 2801): Copolymer of vinylidene fluoride (VDF) and of vinylidene hexafluoride (HFP) at 12% by weight of HFP, characterized by a melt viscosity of 2500 Pa·s at 100 s$^{-1}$ and 230° C.

Lithium Salt: Lithium bis(fluorosulfonyl)imide (LiFSI) sold by Arkema

Preparation of the Mixtures of Fluoropolymers with Different HFP Contents and Manufacture of the Films:

The fluoropolymer mixtures were produced with a Haake® 2-type laboratory twin-screw extruder.

The films were obtained using a flat extrusion method with a Randcastle laboratory single-screw extruder equipped with a flat die. The thickness obtained is approximately 50 μm for each film.

Table 1 illustrates the composition of the films prepared according to the invention and of the films for the comparative examples.

TABLE 1

|  | Example 1 | Example 2 | Comparative Example 1 | Comparative Example 2 | Comparative Example 3 | Comparative Example 4 |
|---|---|---|---|---|---|---|
| PVDF 1 | 75 |  | 100 |  |  |  |
| PVDF 2 |  | 90 |  | 100 |  |  |
| PVDF 3 | 25 | 10 |  |  |  |  |
| PVDF 4 |  |  |  |  | 100 |  |
| PVDF 5 |  |  |  |  |  | 100 |

Impregnation of the Films Into the Electrolyte:

The films were impregnated in an electrolyte consisting of a mixture of ethyl methyl carbonate (EMC) and LiFSI at a concentration of one mol per liter. To do this, a disk 16 mm in diameter is cut out of the film and then immersed for one hour at 30° C. in the electrolyte. The gain in mass of the film is measured by the difference between the masses before and after immersion in the electrolyte.

Measurement of the Ionic Conductivity of the Membrane After Swelling in the Electrolyte:

The conductivity is measured by impedance spectroscopy by placing the swollen fluoropolymer film between two electrodes made of lithium sheets. Table 2 illustrates the ionic conductivity and gain in mass values of the films after immersion in the EMC+1M LiFSI electrolyte.

TABLE 2

|  | Example 1 | Example 2 | Comparative Example 1 | Comparative Example 2 | Comparative Example 3 | Comparative Example 4 |
|---|---|---|---|---|---|---|
| % by weight of HFP in the formulation | 18.75 | 16.2 | 25 | 18 | 15 | 12 |
| Gain in mass (% by weight) | 190 | 200 | Dissolved film | Dissolved film | 86 | 30 |
| Conductivity (mS/cm) | 0.4 | 0.6 | Not measurable | Not measurable | 0.11 | 0.04 |

Examples 1 and 2 show that a higher conductivity than the polymers of comparative examples 3 and 4 described in the literature (U.S. Pat. No. 5,296,318) is obtained. This better conductivity comes in particular from the swelling which is greater.

In addition, the films of examples 1 and 2 after swelling retain good mechanical strength, contrary to comparative examples 1 and 2, for which the films dissolve in the electrolyte and cannot be used. The good mechanical strength of the swollen films is characterized by the fact that the film remains in the form of an intact and manipulable film, contrary to the films of comparative examples 1 and 2, which dissolve in the electrolyte.

Finally, the comparison of example 1 with comparative example 2 shows that it is possible to obtain better properties (mechanical, ionic conductivity) with a formulation according to the invention compared to a fluoropolymer used from the prior art at the same overall content of HFP. Thus, the copolymer of comparative example 2 at 18% by weight of HFP is dissolved in the electrolyte, which makes the film non-manipulable, and its ionic conductivity non-measurable.

The invention claimed is:

1. A nonporous fluoropolymer film comprising one or more layers, wherein at least one layer (layer A) consists of a mixture of two fluoropolymers:
   a. fluoropolymer A which comprises at least one copolymer of vinylidene fluoride (VDF) and hexafluoropropylene (HFP) having an HFP content of greater than or equal to 3% by weight, and
   b. fluoropolymer B which comprises a VDF homopolymer and/or at least one VDF-HFP copolymer, said fluoropolymer B having a weight content of HFP which is at least 3% by weight lower than the weight content of HFP of the polymer A.

2. The film as claimed in claim 1, wherein the HFP content in said at least one VDF-HFP copolymer forming part of the composition of said fluoropolymer A is greater than or equal to 8 weight % and less than or equal to 55 weight %.

3. The film as claimed in claim 1, wherein the fluoropolymer A consists of a VDF-HFP copolymer having an HFP content of greater than or equal to 3 weight %.

4. The film as claimed in claim 1, wherein the fluoropolymer A consists of a mixture of two or more VDF-HFP copolymers, the HFP content of each copolymer being greater than or equal to 3 weight %.

5. The film as claimed in claim 1, wherein the fluoropolymer B is a homopolymer of vinylidene fluoride or a mixture of homopolymers of vinylidene fluoride.

6. The film as claimed in claim 1, wherein the fluoropolymer B consists of a VDF-HFP copolymer having an HFP content of between 1 weight % and 10 weight %.

7. The film as claimed in claim 1, wherein said mixture comprises:
   i. a weight content of polymer A of greater than or equal to 10% and less than or equal to 99%, and
   ii. a weight content of polymer B of less than or equal to 90% and greater than 1%.

8. The film as claimed in claim 1, said film consisting of a single layer having a thickness of 1 to 1000 μm.

9. The film as claimed in claim 1, said film having more than one layer, at least one of the layers consists of a mixture of said polymers A and B, the overall thickness of the film being between 2 μm and 1000 μm.

10. The film as claimed in claim 9, wherein at least one layer other than layer A is chosen from the following polymeric compositions:
   a composition consisting of a fluoropolymer chosen from vinylidene fluoride homopolymers and VDF-HFP copolymers containing at least 90% by weight of VDF;
   a composition consisting of a mixture of fluoropolymer and methyl methacrylate polymer, wherein the fluoropolymer is chosen from vinylidene fluoride homopolymers and VDF-HFP copolymers containing at least 85% by weight of VDF, and wherein the methyl methacrylate (MMA) polymer is chosen from MMA homopolymer and the MMA copolymers containing at least 50% by weight of MMA and at least one other monomer copolymerizable with MMA chosen from: alkyl (meth)acrylates, acrylonitrile, butadiene, styrene and isoprene.

11. A gelled polymer membrane comprising the fluoropolymer film as claimed in claim 1, and an electrolyte comprising at least one solvent and at least one lithium salt.

12. The membrane as claimed in claim 11, wherein said solvent is chosen from cyclic and acyclic alkyl carbonates, ethers, glymes, formates, esters and lactones.

13. The membrane as claimed in claim 11, wherein said lithium salt is chosen from: $LiPF_6$ (lithium hexafluorophosphate), LiFSI (lithium bis(fluorosulfonyl)imide), LiTDI (lithium 2-trifluoromethyl-4, 5-dicyanoimidazolate), $LiPOF_2$, $LiB(C_2O_4)_2$, $LiF_2B(C_2O_4)_2$, $LiBF_4$, $LiNO_3$, $LiClO_4$.

14. The membrane as claimed in claim 11, wherein said electrolyte has a salt concentration of 0.05 to 5 mol/liter in the solvent.

15. The membrane as claimed in claim 11, wherein the electrolyte/fluoropolymers ratio is from 0.05 to 20.

16. A separator for a rechargeable Li-ion battery, consisting of the gelled polymer membrane as claimed in claim 11.

17. A Li-ion storage battery comprising an anode, a cathode and a separator, wherein said separator comprises a gelled polymer membrane as claimed in claim 11.

* * * * *